US010967955B2

(12) United States Patent
 Heuer

(10) Patent No.: US 10,967,955 B2
(45) Date of Patent: Apr. 6, 2021

(54) VERTICAL TAIL UNIT FOR FLOW CONTROL

(71) Applicant: Airbus Operations GmbH, Hamburg (DE)

(72) Inventor: Thomas Heuer, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 249 days.

(21) Appl. No.: 16/153,988

(22) Filed: Oct. 8, 2018

(65) Prior Publication Data
 US 2019/0106201 A1  Apr. 11, 2019

(30) Foreign Application Priority Data
 Oct. 9, 2017 (DE) ............... 10 2017 123 438.1

(51) Int. Cl.
 *B64C 21/08* (2006.01)
 *B64C 21/02* (2006.01)
 *B64C 3/26* (2006.01)
(52) U.S. Cl.
 CPC ........... *B64C 21/08* (2013.01); *B64C 3/26* (2013.01); *B64C 21/025* (2013.01); *B64C 2230/06* (2013.01); *B64C 2230/20* (2013.01); *B64C 2230/22* (2013.01)
(58) Field of Classification Search
 CPC ....... B64C 21/025; B64C 21/02; B64C 21/08; B64C 2230/06; B64C 2230/20; B64C 2230/22; B64C 3/26; Y02T 50/10
 See application file for complete search history.

(56) References Cited

U.S. PATENT DOCUMENTS

| 2,036,891 A | * | 4/1936 | Sline | B64C 21/02 244/204 |
| 2,111,530 A | * | 3/1938 | De Seversky | B64C 21/06 244/209 |
| 2,742,247 A | * | 4/1956 | Lachmann | B64C 21/06 244/130 |

(Continued)

FOREIGN PATENT DOCUMENTS

| DE | 4436748 C1 | 9/1995 |
| DE | 10 2010 014 640 A1 | 10/2011 |
| DE | 10 2010 014 641 A1 | 10/2011 |
| DE | 10 2010 036 154 A1 | 3/2012 |

(Continued)

OTHER PUBLICATIONS

Search Report for DE102017123438.1, Jun. 12, 2018, 8 pages.

(Continued)

*Primary Examiner* — Medhat Badawi
(74) *Attorney, Agent, or Firm* — Nixon & Vanderhye P.C.

(57) ABSTRACT

A vertical tail unit (7) including an outer skin (13) in contact with an ambient air flow (21), wherein the outer skin (13) extends between a leading edge (23) and a trailing edge (25) with opposite lateral sides (27a, 27b), and surrounds an interior space (29), and wherein the outer skin (13) has a porous section at the leading edge (23), a pressure chamber (15) arranged in the interior space (29), wherein the pressure chamber (15) is fluidly connected to the porous section (31), an air inlet (17) provided in the outer skin (13) and fluidly connected to the pressure chamber (15), and an air outlet (19) provided in the outer skin (13) and fluidly connected to the pressure chamber (15).

11 Claims, 2 Drawing Sheets

(56) References Cited

U.S. PATENT DOCUMENTS

| | | | | |
|---|---|---|---|---|
| 2,776,100 A * | 1/1957 | Breguet | ................ | B64C 3/26 244/124 |
| 3,213,527 A * | 10/1965 | Glaze | ................ | B64C 21/04 140/107 |
| 3,770,560 A * | 11/1973 | Elder | ................ | B32B 3/266 428/138 |
| 3,820,628 A * | 6/1974 | Hanson | ................ | F02C 7/24 181/214 |
| 4,000,869 A * | 1/1977 | Wong | ................ | B64D 33/02 244/53 B |
| 4,169,567 A * | 10/1979 | Tamura | ................ | B64C 21/025 244/17.11 |
| 4,263,842 A * | 4/1981 | Moore | ................ | F24F 13/15 454/318 |
| 4,657,482 A * | 4/1987 | Neal | ................ | F02C 7/18 415/116 |
| 5,114,100 A * | 5/1992 | Rudolph | ................ | B64C 21/06 244/130 |
| 5,172,874 A * | 12/1992 | Maciocia | ................ | B64D 17/025 244/142 |
| 5,263,667 A * | 11/1993 | Horstman | ................ | B64C 21/06 244/130 |
| 5,366,177 A * | 11/1994 | DeCoux | ................ | B64C 21/06 244/201 |
| 5,398,410 A * | 3/1995 | Yasui | ................ | B21D 26/055 228/157 |
| 5,590,854 A * | 1/1997 | Shatz | ................ | B64C 1/12 244/130 |
| 5,741,456 A * | 4/1998 | Ayrton | ................ | B29C 70/545 264/400 |
| 5,743,488 A * | 4/1998 | Rolston | ................ | B64C 21/025 181/214 |
| 5,791,601 A * | 8/1998 | Dancila | ................ | B64C 9/38 244/17.25 |
| 5,796,612 A * | 8/1998 | Palmer | ................ | B64D 15/20 701/4 |
| 5,806,796 A * | 9/1998 | Healey | ................ | B29C 44/1233 244/117 R |
| 5,813,625 A * | 9/1998 | Hassan | ................ | B64C 23/06 244/17.11 |
| 5,899,416 A | 5/1999 | Meister et al. | | |
| 5,923,003 A * | 7/1999 | Arcas | ................ | B64C 21/04 181/213 |
| 5,971,328 A * | 10/1999 | Kota | ................ | B63B 1/248 244/219 |
| 5,987,880 A * | 11/1999 | Culbertson | ................ | F02K 1/70 239/265.37 |
| 6,050,523 A * | 4/2000 | Kraenzien | ................ | B64C 9/00 244/123.1 |
| 6,135,395 A | 10/2000 | Collett | | |
| 6,142,425 A * | 11/2000 | Armanios | ................ | B64C 9/38 239/562 |
| 6,179,086 B1 * | 1/2001 | Bansemir | ................ | G10K 11/172 181/198 |
| 6,199,796 B1 * | 3/2001 | Reinhard | ................ | B64C 3/30 244/35 R |
| 6,216,982 B1 * | 4/2001 | Pfennig | ................ | B64C 21/06 244/130 |
| 6,612,524 B2 * | 9/2003 | Billman | ................ | B64C 23/06 244/130 |
| 6,622,973 B2 * | 9/2003 | Al-Garni | ................ | B63H 25/40 244/206 |
| 6,752,358 B1 * | 6/2004 | Williams | ................ | B64C 1/12 244/208 |
| 7,048,230 B2 * | 5/2006 | Meyer | ................ | B64D 33/02 244/130 |
| 7,743,884 B2 * | 6/2010 | Thomas | ................ | B64C 1/40 181/292 |
| 8,042,772 B2 * | 10/2011 | Lutke | ................ | B64C 3/46 244/219 |
| 8,091,837 B2 * | 1/2012 | Frankenberger | ................ | F15D 1/12 244/209 |
| 8,282,037 B2 * | 10/2012 | Jain | ................ | B64D 33/02 244/53 B |
| 8,336,804 B2 * | 12/2012 | Hoetzeldt | ................ | G10K 11/172 244/1 N |
| 8,459,597 B2 * | 6/2013 | Cloft | ................ | F02C 7/045 244/208 |
| 8,596,573 B2 | 12/2013 | Ashok | | |
| 8,596,584 B2 * | 12/2013 | Knacke | ................ | B64C 21/02 244/214 |
| 8,695,915 B1 * | 4/2014 | Jones | ................ | B64C 23/005 244/1 N |
| 8,783,624 B2 * | 7/2014 | Koppelman | ................ | B64C 21/06 244/209 |
| 8,800,915 B2 * | 8/2014 | Gerber | ................ | B64C 5/06 244/53 B |
| 8,864,082 B2 * | 10/2014 | Syassen | ................ | B64C 21/06 244/209 |
| 8,974,177 B2 * | 3/2015 | Atassi | ................ | F02K 3/06 415/201 |
| 9,132,909 B1 * | 9/2015 | Khorrami | ................ | B64C 9/18 |
| 9,193,443 B2 * | 11/2015 | Voege | ................ | B64C 21/06 |
| 9,272,772 B2 * | 3/2016 | Reckzeh | ................ | B64C 21/06 |
| 9,278,753 B2 * | 3/2016 | Reckzeh | ................ | B64C 21/02 |
| 9,511,848 B2 * | 12/2016 | Gerber | ................ | B64C 3/26 |
| 10,005,545 B2 | 6/2018 | Alderman et al. | | |
| 10,183,740 B2 * | 1/2019 | Gerber | ................ | B64C 5/06 |
| 2003/0132351 A1 | 7/2003 | Billman et al. | | |
| 2003/0141144 A1 * | 7/2003 | Wilson | ................ | B23K 26/0006 181/292 |
| 2003/0178250 A1 * | 9/2003 | Putt | ................ | C04B 38/0006 181/290 |
| 2005/0045774 A1 * | 3/2005 | Hocking | ................ | B64C 21/06 244/209 |
| 2005/0151026 A1 | 7/2005 | Meyer | | |
| 2006/0272279 A1 * | 12/2006 | Palumbo | ................ | B60R 13/08 52/783.1 |
| 2007/0029450 A1 * | 2/2007 | Kloker | ................ | B64C 21/06 244/204 |
| 2007/0084297 A1 * | 4/2007 | Powell | ................ | B64C 21/025 73/861 |
| 2007/0221788 A1 * | 9/2007 | Meister | ................ | B64C 21/025 244/208 |
| 2007/0264152 A1 * | 11/2007 | Zhao | ................ | B22F 3/1134 420/591 |
| 2007/0292658 A1 * | 12/2007 | Thomas | ................ | G10K 11/168 428/116 |
| 2008/0112796 A1 * | 5/2008 | Coney | ................ | F02K 1/827 415/115 |
| 2008/0296439 A1 | 12/2008 | Cloft et al. | | |
| 2009/0210103 A1 * | 8/2009 | Cook | ................ | B64C 21/025 701/3 |
| 2009/0212165 A1 * | 8/2009 | Parikh | ................ | B64C 21/06 244/209 |
| 2009/0250293 A1 * | 10/2009 | Gleine | ................ | B32B 27/18 181/292 |
| 2009/0261204 A1 * | 10/2009 | Pitt | ................ | B64C 21/08 244/201 |
| 2009/0266937 A1 * | 10/2009 | Frankenberger | ................ | B64C 21/06 244/209 |
| 2010/0187360 A1 * | 7/2010 | Rawlings | ................ | B32B 15/20 244/130 |
| 2010/0187361 A1 * | 7/2010 | Rawlings | ................ | B32B 15/08 244/130 |
| 2010/0216385 A1 * | 8/2010 | Heuer | ................ | B64D 13/00 454/71 |
| 2010/0294892 A1 | 11/2010 | Syassen | | |
| 2011/0117338 A1 * | 5/2011 | Poquette | ................ | C23C 18/1644 428/213 |
| 2011/0212291 A1 * | 9/2011 | Buellesbach | ................ | B64C 1/062 428/99 |
| 2011/0262721 A1 * | 10/2011 | Albertelli | ................ | B29C 70/086 428/196 |
| 2011/0284689 A1 * | 11/2011 | Thomas | ................ | B64C 1/40 244/1 N |
| 2011/0306285 A1 * | 12/2011 | Heuer | ................ | B64D 13/02 454/76 |

(56) References Cited

U.S. PATENT DOCUMENTS

| | | | |
|---|---|---|---|
| 2012/0037760 A1* | 2/2012 | Koppelman | B64C 21/06 244/209 |
| 2012/0187252 A1* | 7/2012 | Gerber | B64C 21/06 244/209 |
| 2013/0025727 A1* | 1/2013 | Gerber | B64C 21/06 137/899.2 |
| 2014/0021304 A1* | 1/2014 | Gerber | B64C 3/26 244/35 R |
| 2014/0295747 A1* | 10/2014 | Schmid | B64D 13/00 454/76 |
| 2015/0259060 A1* | 9/2015 | Khorrami | B64C 1/40 244/1 N |
| 2016/0068250 A1* | 3/2016 | Meyer | B64C 9/14 244/123.1 |
| 2016/0159465 A1* | 6/2016 | Koppelman | B64C 21/06 244/209 |
| 2016/0185449 A1* | 6/2016 | Baker | B64C 15/14 244/99.12 |
| 2017/0197706 A1* | 7/2017 | Garcia Nieto | B64C 3/26 |
| 2017/0369147 A1* | 12/2017 | Wong | B64C 3/26 |
| 2018/0134373 A1* | 5/2018 | Reckzeh | F15D 1/0055 |
| 2018/0265208 A1* | 9/2018 | Yousef | B64D 27/18 |
| 2019/0106201 A1* | 4/2019 | Heuer | B64C 21/08 |
| 2019/0106202 A1* | 4/2019 | Heuer | B64C 3/26 |

FOREIGN PATENT DOCUMENTS

| | | |
|---|---|---|
| EP | 2 208 669 | 7/2010 |
| EP | 2 853 485 | 4/2015 |
| EP | 2 891 606 A1 | 7/2015 |
| GB | 718421 | 11/1954 |
| GB | 2234351 A | 10/1998 |
| RU | 2 508 228 | 2/2014 |
| WO | 9221560 | 12/1992 |
| WO | 9847761 | 10/1998 |
| WO | 2011/128 069 A1 | 10/2011 |

OTHER PUBLICATIONS

Wong et al. "Drag Reduction Using Boundary Layer Suction and Blowing", CEAS/KATnet Conference on Key Aerodynamic Technologies (Jun. 2005).

Schrauf et al, "Simplified Hybrid Laminar Flow Control", European Congress on Computational Methods in Applied Science and Engineering CCOMAS 2004 (Jul. 2004).

Schrauf "Status and Perspective of Laminar Flow" The Aeronautical Journal, vol. 109, pp. 639-644 (Dec. 2005).

Wagner et al, "Laminar Flow Control Leading Edge Systems in Simulated Airline Service," 16th Congress of the International Council of the Aeronautical Sciences (Aug. 1988).

Braslow "A History of Suction-Type Laminar Flow Control with Emphasis on Flight Research", NASA History Division, Monographs in Aerospace (1999). History, No. 13.

Wong et al, "Studies of Methods and Philosophies for Designing Hybrid Laminar Flow Wings," ICAS 2000 Congress, pp. 282.1 to 282.11 (Aug. 2000).

Joslin, "Aircraft Laminar Flow Control", Annular Review of Fluid Mechanics, vol. 30; pp. 1-29 (1998).

Henke, "A 320 HLF Fin: Flight Test Completed", Air & Space Europe, vol. 1, No. 2 (1999).

"Hight Reynolds Number Hybrid Laminar Flow Control (HLFC) Flight Experiment: IV Suction System Design and Manufacture", NASA/CR-1999-209326 (Apr. 1999).

Schmitt et al, "Hybrid Laminar Fin Investigation", Paper RTO AVT Symposium on Active Technology for Enhanced Performance Operational Capabilities of Military Aircraft, Land Vehicles and Sea Vehicles, RTO MP-051 (May 2000).

Search Report for DE 10 2017 115 558.9, dated Mar. 5, 2018, 9 pages.

Office Action cited in Application No. RU2018135304 and Translation, dated May 13, 2019, 7 pages.

Search Report cited in Application No. RU2018135304 and Translation, dated May 13, 2019, 4 pages.

Udo Krause, "Air Outlet Design for a Passively Driven Hybrid Laminar Flow Control System", XP055551195, May 23, 2016, 1 page.

Max Kingsley-Jones, "Farnborough: Aero Secrets of Boeing's New Dreamliner", https://www.flightglobal.com/news/articles/farnborough-aero-secrets-of-boeings-new-dreamliner-401784, (Jul. 2014), 5 pages.

Charles Frick et al, "An Experimental Investigation of NACA Submerged-Duct Entrances", NACA Advance Confidential Report No. 5120, NACA Report, (Oct. 1945), 58 pages..

European Search Report cited in EP 18 19 5437, dated Feb. 21, 2019, 10 pages.

* cited by examiner

VERTICAL TAIL UNIT FOR FLOW CONTROL

RELATED APPLICATION

This application claims priority to German Patent Application No. 10 2017 123 438.1 filed Oct. 9, 2017, the entirety of which is incorporated by reference.

TECHNICAL FIELD

The present invention relates to a vertical tail unit for an aircraft. The vertical tail unit is configured for flow control, such as for hybrid laminar flow control. A further aspect of the present invention relates to an aircraft comprising such a vertical tail unit.

BACKGROUND OF THE INVENTION

The vertical tail unit comprises an outer skin, a pressure chamber, an air inlet, and an air outlet. The vertical tail unit may further comprises a plurality of structural parts, such as stiffeners, for supporting the outer skin from the inside. Further the vertical tail unit may include a vertical stabilizer and a rudder pivotally mounted to the vertical stabilizer.

The outer skin is in contact with an ambient air flow and extends between a leading edge facing the incoming flow, and a trailing edge. Further, the outer skin has two opposite lateral sides and surrounds an interior space. The outer skin further comprises a porous section in the area of the leading edge for letting air through the outer skin. The porous section might be formed e.g. as a perforated skin panel or as a skin panel made from a porous material.

The pressure chamber is arranged in the interior space for holding an overpressure or an under pressure with respect to the pressure of the ambient air flow in front of the porous section. The pressure chamber is fluidly connected to the porous section.

The air inlet is provided in the outer skin for letting in air from the ambient air flow. The air inlet is fluidly connected to the pressure chamber and configured to cause, in flight of the associated aircraft, an overpressure in the pressure chamber, such that air from the pressure chamber discharges through the porous section to the ambient air flow.

The air outlet is provided in the outer skin for letting out air into the ambient air flow. The air outlet is fluidly connected to the pressure chamber and configured to cause, in flight of the associated aircraft, an underpressure in the pressure chamber such that air from the ambient air flow is sucked in through the porous section into the pressure chamber. The air outlet may be formed as a movable flap that is or can be opened in the direction of the trailing edge.

Such vertical tail units are known in the art. The air inlet of the known vertical tail units is often formed as an air scoop that projects out of the outer skin into the ambient air flow. However, such an air scoop causes additional drag at the vertical tail unit and decreases efficiency.

SUMMARY OF THE INVENTION

An invention has been made and is disclosed herein that may be embodied as a vertical tail unit with reduced drag an increased efficiency.

An embodiment of the invention is a vertical tail unit having an air inlet is formed as an opening that is arranged in one lateral side of the outer skin and that is flush with the outer skin, in particular with the outer mold line. The opening might be formed as a hole in the outer skin with a channel following to the inside of the vertical tail unit. In such a way, no parts of the air inlet project out from the outer skin into the ambient air flow so that no additional drag is caused by the air inlet or at least the additional drag is minimized.

The air inlet may comprise an inward-pivoting door. The door can be pivoted between a closed position where an ambient air flow is inhibited from passing through the outer skin and entering the vertical tail unit, and an opened position where the ambient air flow may pass through the outer skin into the vertical tail unit. In the closed position the door is flush with the outer skin, and in the opened position a channel is formed between the door and an edge of the opening, for ambient air flow to pass through the outer skin into the vertical tail unit. The channel may point to the leading edge. By such an inward-pivoting door the air inlet can be opened and closed without projecting out of the outer skin into the ambient air flow.

In particular, the door may be mounted to the vertical tail unit by a hinge. The hinge is arranged at that side of the door facing the leading edge, so that the channel opens in the direction of the leading edge. The hinge may have a vertical hinge axis. In such a way, air of the ambient air flow can flow into the channel without being deflected.

According to a further embodiment, the air inlet has two opposite side walls between which the door moves when pivoting between the opened and closed positions. The side walls proceed in a diverging manner with respect to one another in a direction from the leading edge to the trailing edge, i.e. along the channel from the hinge to the inlet duct. In particular, the side walls may proceed in the form of a wave in the direction from the leading edge to the trailing edge such that the distance between the side walls first increases with an increasing slope and subsequently increases with a decreasing slope. By such geometry of the side walls particularly advantageous mass flow rate and flow conditions can be obtained.

The air inlet may be arranged further to a root of the vertical tail unit than the porous section. The root relates to that part of the vertical tail unit where the vertical tail unit is or can be connected to a fuselage. In other words, the air inlet is arranged below the porous section. In such a way, the air inlet and the porous section do not interfere one another.

The air inlet may be connected to the pressure chamber via an inlet duct. The inlet duct may proceed from the air inlet upwards to the pressure chamber.

The air outlet may be connected to the pressure chamber via an outlet duct. At t least parts of the inlet duct and the outlet duct may be formed integrally. In such a way, a minimum amount of structure and thus weight is required.

A further aspect of the present invention relates to an aircraft comprising a vertical tail unit according to any of the above described embodiments. The features and advantages mentioned above in connection with the vertical tail unit also apply for the aircraft.

SUMMARY OF THE DRAWINGS

Hereinafter, an embodiment(s) of the present invention is described in more detail by means of a drawing. The drawing shows in FIG. 1 a side view of the tail section of an aircraft according to the invention, FIG. 2 a detailed cross sectional view of an air inlet of the aircraft from FIG. 1 with a door in an opened position, and FIG. 3 the air inlet from FIG. 2 with the door in a closed position, and FIG. 4 a detailed perspective view of the air inlet shown in FIG. 2 with the door in the opened position.

DETAILED DESCRIPTION OF EMBODIMENTS OF THE INVENTION

Figure 1:
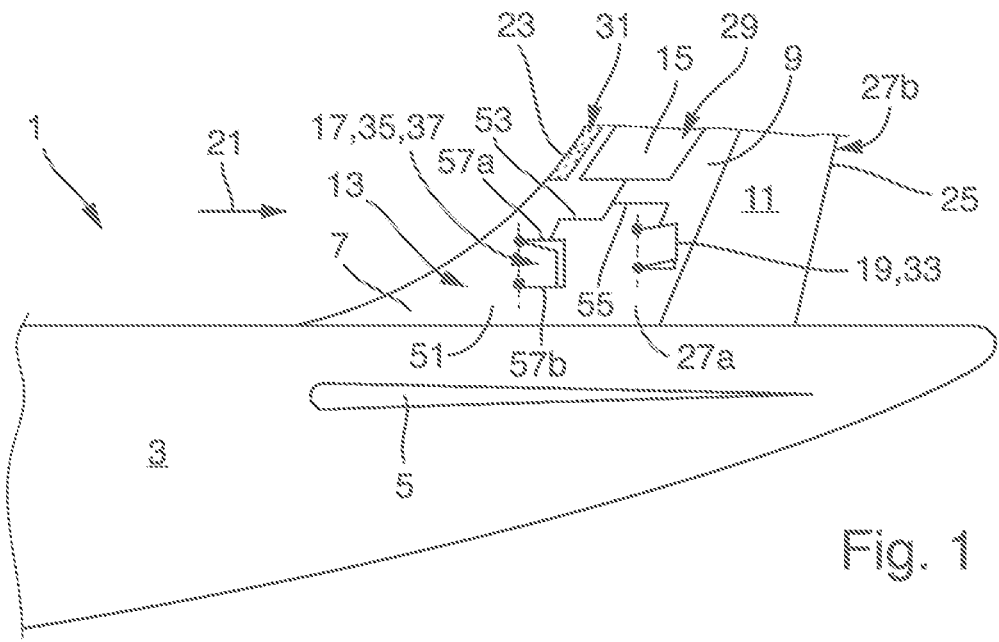

In FIG. 1 an embodiment of an aircraft 1 according to the invention is illustrated. The aircraft 1 comprises a fuselage 3, a horizontal tail unit 5, and a vertical tail unit 7 according to an embodiment of the invention. The vertical tail unit 7 comprises a vertical stabilizer 9 and a rudder 11 pivotally mounted to the vertical stabilizer 9. The vertical tail unit 7 is configured for hybrid laminar flow control and comprises an outer skin 13, a pressure chamber 15, an air inlet 17, and an air outlet 19.

The outer skin 13 is in contact with an ambient air flow 21 and extends between a leading edge 23 and a trailing edge 25. Further, the outer skin 13 has two opposite lateral sides 27a, 27b and surrounds an interior space 29. The outer skin 13 further comprises a porous section 31 in the area of the leading edge 23 for letting air through the outer skin 13.

The pressure chamber 15 is arranged in the interior space 29 for holding an overpressure or an underpressure with respect to the pressure of the ambient air flow 21 in front of the porous section 31. The pressure chamber 15 is fluidly connected to the porous section 31.

The air outlet 19 is arranged in the outer skin 13 for letting out air into the ambient air flow 21. The air outlet 19 is fluidly connected to the pressure chamber 15 and configured to cause, in flight of the associated aircraft 1, an underpressure in the pressure chamber 15 such that air from the ambient air flow 21 is sucked in through the porous section 31 into the pressure chamber 15. The air outlet 19 includes a pivotable flap 33 that can be opened in the direction of the trailing edge 25.

The air inlet 17 is arranged in the outer skin 13 for letting air from the ambient air flow 21 into the vertical tail unit 7. The air inlet 17 is fluidly connected to the pressure chamber 15 and configured to cause, in flight of the associated aircraft 1, an overpressure in the pressure chamber 15, such that air from the pressure chamber 15 discharges through the porous section 31 to the ambient air flow 21. The air inlet 17 is formed as an opening 35 that is arranged in one lateral side 27a of the outer skin 13 and that is flush with the outer skin 13.

Figure 2:
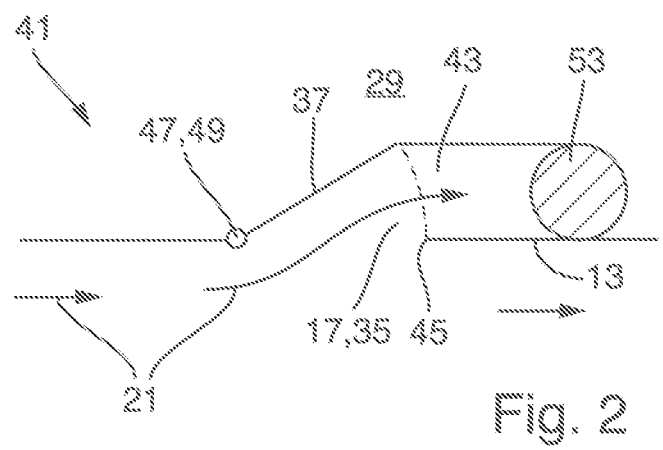
Figure 3:
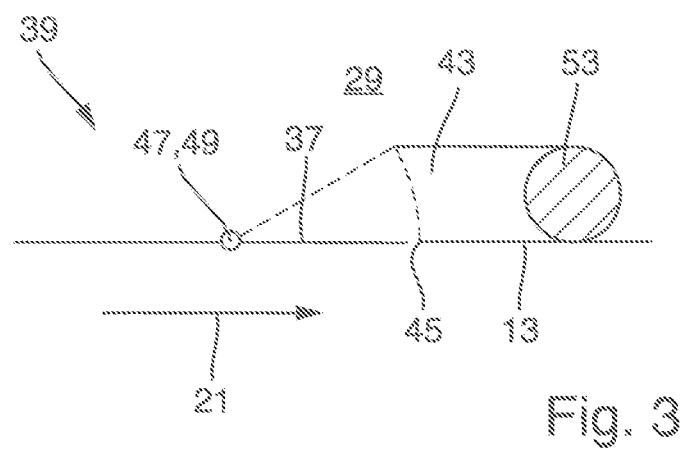

As shown in FIGS. 2 and 3, the air inlet 17 comprises an inward-pivoting door 37 that can be pivoted between a closed position 39 (FIG. 3) where an ambient air flow 21 is inhibited from passing through the outer skin 13 and entering the vertical tail unit 7, and an opened position 41 (FIG. 2) where the ambient air flow 21 may pass through the outer skin 13 into the vertical tail unit 7. In the closed position 39 the door 37 is flush with the outer skin 13, and in the opened position 41 a channel 43 is formed between the door 37 and an edge 45 of the opening 35, for ambient air flow 21 to pass through the outer skin 13 into the vertical tail unit 7. The door 37 is mounted to the vertical tail unit 7 by a hinge 47. The hinge 47 is arranged at that side of the door 37 facing the leading edge 23, so that the channel 43 opens in the direction of the leading edge 23. The hinge 47 has a vertical hinge axis 49.

As shown in FIG. 1, the air inlet 17 is arranged further to a root 51 of the vertical tail unit 7 than the porous section 31. The air inlet 17 is connected to the pressure chamber 15 via an inlet duct 53 that proceeds from the air inlet 17 upwards to the pressure chamber 15. The air outlet 19 is connected to the pressure chamber 15 via an outlet duct 55. Wide parts of the inlet duct 53 and the outlet duct 55 are formed integrally. The air inlet 17 and the air outlet 19 are arranged at the same lateral side 27a in FIG. 1, however, they might also be arranged at opposite lateral sides 27a, 27b.

Figure 4:
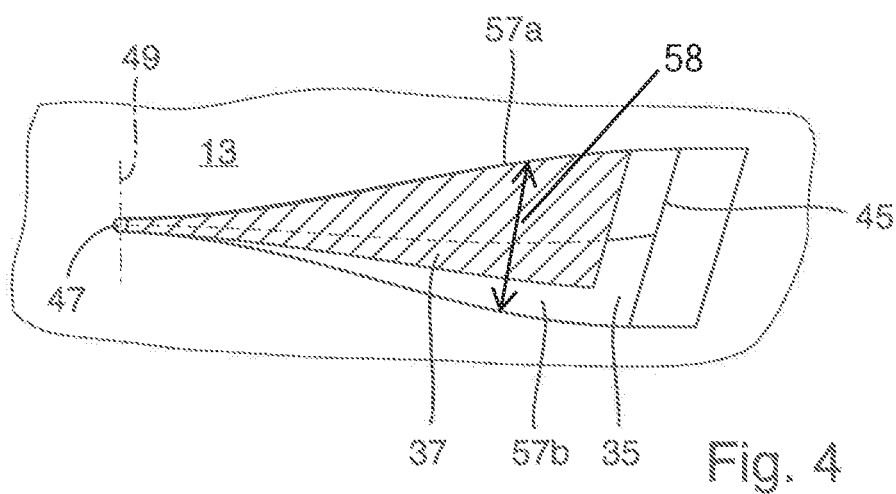

As shown in FIG. 4, the air inlet 17 has two opposite side walls 57a, 57b that proceed in a diverging manner (see arrows 58) in a direction from the leading edge 23 to the trailing edge 25. The side walls 57a, 57b proceed in the form of a wave in the direction from the leading edge 23 to the trailing edge 25 such that the distance between the side walls 57a, 57b first increases with an increasing slope and subsequently increases with a decreasing slope.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vertical tail unit comprising:

an outer skin configured to contact an ambient air flow, wherein the outer skin forms a leading edge and opposite lateral sides each extending from the leading edge to a trailing edge, wherein the outer skin surrounds an interior space, and wherein the outer skin comprises a porous section in an area of the leading edge, a pressure chamber arranged in the interior space, wherein the pressure chamber is fluidly connected to the porous section, an air inlet in and flush with one of the lateral sides, fluidly connected to the pressure chamber and configured to cause an overpressure in the pressure chamber such that air discharges through the porous section into the ambient air flow;

an air outlet in the outer skin fluidly connected to the pressure chamber, having a closed mode during the overpressure in the pressure chamber and an open mode which creates an under pressure in the pressure chamber causing air of the ambient air flow is sucked in through the porous section, and an inward-pivoting door including a leading end and a trailing edge, wherein the door is pivotable about the leading end between a closed position where the ambient air flow is inhibited from passing through the air inlet and entering the vertical tail unit, and an opened position where the ambient air flow passes through the air inlet and into the vertical tail unit, wherein, in the closed position, the door is flush with the outer skin and closes the air inlet, and wherein, in the opened position, the inward-pivoting door is pivoted about the leading end and the trailing edge is inward of the air inlet to form a channel between the door and the air inlet for ambient air to pass through the air inlet, into the channel and into the vertical tail unit.

2. The vertical tail unit according to claim 1, wherein the door is mounted to the vertical tail unit by a hinge, wherein the hinge is arranged at a side of the door facing the leading edge.

3. The vertical tail unit according to claim 1, wherein the hinge has a vertical hinge axis.

4. The vertical tail unit according to claim 1, wherein the air inlet includes opposite side walls that diverge from each other in a direction extending from the leading edge towards the trailing edge.

5. The vertical tail unit according to claim 4, wherein the side walls of the air inlet each have a curvature in the direction from the leading edge to the trailing edge.

6. The vertical tail unit according to claim 1, wherein the air inlet is arranged further to a root of the vertical tail unit than the porous section.

7. The vertical tail unit according to claim 1, wherein the air inlet is connected to the pressure chamber via an inlet duct.

8. The vertical tail unit according to claim 7, wherein the air outlet is connected to the pressure chamber via an outlet duct.

9. The vertical tail unit according to claim 8, wherein at least parts of the inlet duct and the outlet duct are formed integrally.

10. An aircraft comprising a vertical tail unit according to claim 1.

11. A vertical tail unit for an aircraft comprising
an outer skin configured to contact ambient air flowing over the aircraft during flight, wherein the outer skin forms a leading edge and includes opposite lateral sides extending from the leading edge towards a trailing edge of the vertical tail unit, wherein the outer skin comprises a porous section in an area of the leading edge;
an interior volume within the outer skin;
a pressure chamber in the interior space fluidly connected to the porous section,
an air inlet opening in one of the lateral sides of the outer skin and the air inlet opening is flush with the outer skin of the one of the lateral sides, wherein the air inlet opening has a forward end facing the leading edge and a trailing edge facing the trailing edge;
an air inlet door, which when closed, closes the air inlet opening and is flush with the outer skin and the air inlet door, when open, is recessed into the outer skin to open the air inlet, the air inlet door has a forward end proximate to the forward end of the air inlet opening and a trailing edge adjacent the trailing edge of the air inlet opening when the air inlet door is closed, wherein a channel is formed between the air inlet opening and the air inlet door when the air inlet door is opened by pivoting the air inlet door proximate the forward edge and moving the trailing edge inward of the air inlet opening and the outer skin, and, while the air inlet door is opened, ambient air flowing over the outer skin passes through the air inlet, through the channel and into the pressure chamber to cause an overpressure in the pressure chamber such that air discharges from the pressure chamber, through the porous section and into ambient air flowing over the porous section, and
an air outlet duct including a discharge opening facing away from a flow direction of ambient air flowing over the outlet duct, wherein the air outlet duct is fluidly connected to the pressure chamber and configured to cause an under pressure in the pressure chamber such that, while the air outlet duct is open, ambient air flowing over the porous section is sucked in through the porous section and into the pressure chamber.

\* \* \* \* \*